(No Model.)

W. P. BROWN.
TONGUE CHAIN FOR WAGONS.

No. 333,386. Patented Dec. 29, 1885.

Attest:
Sidney P. Hollingsworth
W. H. Shipley

Inventor:
W. P. Brown
By his Atty.
Phil. T. Dodge

N. PETERS, Photo-Lithographer, Washington, D. C.

UNITED STATES PATENT OFFICE.

WILLIAM PATTERSON BROWN, OF ZANESVILLE, OHIO.

TONGUE-CHAIN FOR WAGONS.

SPECIFICATION forming part of Letters Patent No. 333,386, dated December 29, 1885.

Application filed September 17, 1885. Serial No. 177,360. (No model.)

*To all whom it may concern:*

Be it known that I, WILLIAM P. BROWN, of Zanesville, in the county of Muskingum and State of Ohio, have invented certain Improvements in Tongue-Chains for Wagons, &c., of which the following is a specification.

This invention has reference to the tongue-chains commonly employed in place of a neck-yoke to connect the tongue or draft-pole of a wagon, plow, or other implement with the hames or other part of the harness.

It is the object of the invention to prevent the tongue from vibrating laterally and striking the draft-animals, and at the same time to provide for an elastic or yielding action of the parts, in order that the animals may be protected from the severe shocks and strain to which they are commonly subjected.

To this end it consists, essentially, in combining with the usual draft-chains shorter transverse chains or their equivalents, and connecting them with the pole to prevent the side play of the latter; also, in combining with the main chain and the secondary chains or branches yielding links for connecting them with the harness; also, in certain minor details, which will be hereinafter described.

Figure 1:
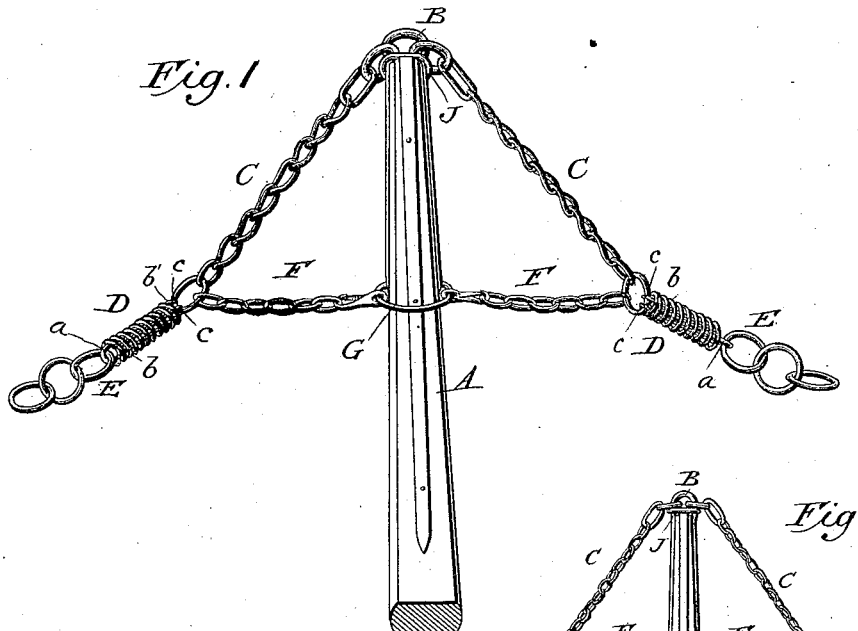
Figure 4:
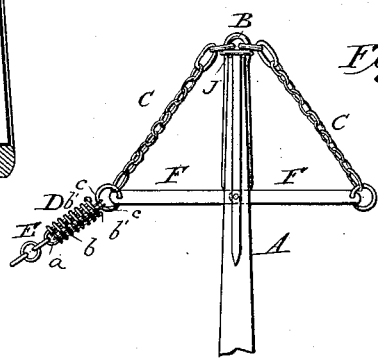
Figure 2:
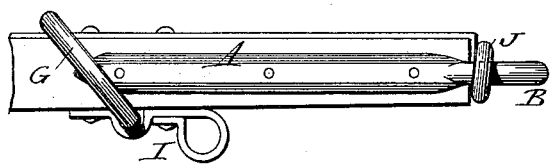
Figure 3:
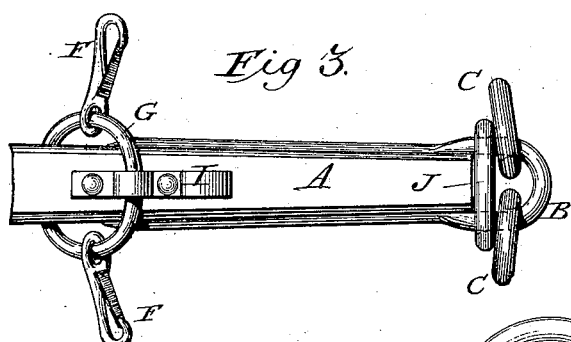
Figure 5:
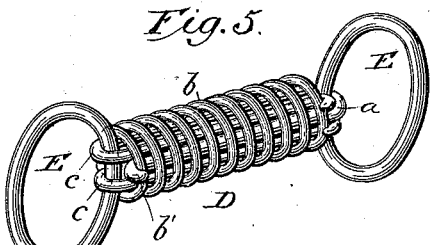
Figure 6:
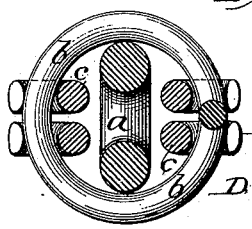

In the accompanying drawings, Figure 1 represents a perspective view of my device in its preferred form as it appears when attached to a tongue in position for use. Fig. 2 is a side elevation of the tongue. Fig. 3 is a bottom plan view of the same, showing the manner of connecting the chains thereto. Fig. 4 represents a modified form of the device. Fig. 5 is a perspective view of one of the elastic links. Fig. 6 is a cross-section of the same.

A represents the pole, provided at the forward end with an eye or clevis-strap, B, of the ordinary or substantially the ordinary form.

C C represents the two neck-chains connected at their inner ends to the eye, and at their outer ends to elastic links D, which are in turn provided at their outer ends with links E or equivalent devices by which to connect them with the harness.

F F represent the branch or guide chains forming the subject of the present invention. As shown, they are attached at their outer ends to the respective links D, and at their inner ends to the pole, at a distance of twelve inches (more or less) in rear of the point at which the neck-chains C are attached. The guide or brace chains F are of a length less than that of the neck-chains. Under ordinary conditions the guide-chains are slack and permit the neck-chains to operate in the ordinary manner, but the instant there is any tendency of the tongue to swing laterally one or the other of the guide-chains F will act to prevent such motion.

I commonly combine the guide-chains with snap-hooks, as shown in the drawings, or other equivalent devices by which they may be lengthened or shortened, as the size of the animals, the distance apart at which they are to travel, or other circumstances may demand.

I commonly connect the inner ends of the guide-chains to the tongue by means of a ring, G, encircling the pole, and secured in position by a plate or stirrup, I, on the under side, this stirrup being also adapted to serve as an eye for the attachment of an additional draft animal or animals.

The elastic links D may be of any appropriate form, with springs of metal or rubber, as preferred; but I recommend the particular construction represented in the drawings as best adapted for practical purposes.

A U-shaped stirrup, a, embraces the ring E, and is passed through a spiral spring, b, with its ends b' turned outward to engage the spring. Two links, c, embracing at one end a ring to receive the chains, are extended lengthwise through the spring and hooked at their extremities over its opposite end, as shown. When the strain is applied to the chains, the links tend to compress the same, so that it serves as a yielding or elastic connection between the chains and the harness. It will be observed that this yielding connection serves alike for the main and the guide chains.

The essence of the invention consists in combining with the neck-chains the rear transverse guides or braces to prevent lateral motion of the tongue, in connection with elastic links or equivalent yielding extensions at the outer end to relieve the shocks to which the animals would be subjected by a rigid connection. These braces may be modified in form and arrangement, provided a mode of action such as herein described is retained.

In place of the chains I may employ, as shown in Fig. 4, a transverse bar or bars jointed to the tongue and connected at the outer ends to the neck-chains. In such a case the yielding link D is applied at the outer end, as illustrated in the drawings.

In order to protect the front of the tongue from wear, to strengthen the eye or clevis-plate, and to spread or separate the main chains, I encircle the eye or clevis-plate by a link or plate, J, seated against the end of the tongue, as plainly shown.

I am aware that neck-chains have been connected at their outer ends with the tongue by bars or rods, the arrangement being such that the outer ends of the chains were prevented from playing forward and backward, and to such construction I lay no claim.

It is to be noted that my devices afford a yielding or flexible connection between the tongue and the draft-animals, limiting side play of the tongue, but at the same time permitting it to yield freely in all directions, so as to prevent the team from receiving the violent shocks which would otherwise result from the sudden stopping and starting of the wagon in passing over rough ground.

I am aware that spring-links consisting of a spiral spring with two stirrups passed therethrough in opposite directions are old, and I lay no claim thereto; but in practice I have found that by the employment of three links, as shown in the drawings, a much better and easier action of the parts is secured.

Having thus described my invention, what I claim is—

1. In combination with a wagon-tongue, chains extending outward and rearward from its forward end, spring-links applied at the outer ends of said chains, and transverse connections extending from the inner ends of the links to the pole, substantially as described, whereby side play of the pole is prevented.

2. In combination with the tongue, the neck-chains attached to its forward end and extending rearward, spring-links applied to the outer ends of said chains, and the adjustable guide-chains F, substantially as described.

3. In a pole attachment, the combination of the pole, the eye or clevis-plate thereon, the tongue-chains C, and the link J, applied as and for the purpose described.

In testimony whereof I hereunto set my hand, this 13th day of August, 1885, in the presence of two attesting witnesses.

WILLIAM PATTERSON BROWN.

Witnesses:
R. A. BONIFIELD,
N. S. CHANDLER.